(12) United States Patent
McAleenan et al.

(10) Patent No.: US 8,565,782 B2
(45) Date of Patent: Oct. 22, 2013

(54) METHOD AND ARRANGEMENT FOR POSITIONING IN A MOBILE TELECOMMUNICATION NETWORK

(75) Inventors: Dominic McAleenan, Alta (SE); Ari Kangas, Lidingo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 823 days.

(21) Appl. No.: 12/663,995

(22) PCT Filed: Jun. 18, 2007

(86) PCT No.: PCT/SE2007/050430
§ 371 (c)(1),
(2), (4) Date: Dec. 10, 2009

(87) PCT Pub. No.: WO2008/156393
PCT Pub. Date: Dec. 24, 2008

(65) Prior Publication Data
US 2010/0178940 A1 Jul. 15, 2010

(51) Int. Cl.
*H04W 64/00* (2009.01)
(52) U.S. Cl.
USPC ............................. 455/456.1; 455/456.3
(58) Field of Classification Search
USPC ............................ 455/453, 456.1, 456.3, 466
See application file for complete search history.

(56) References Cited

U.S. PATENT DOCUMENTS

| | | | |
|---|---|---|---|
| 2004/0033808 A1 | 2/2004 | Rorabaugh | |
| 2005/0075111 A1 | 4/2005 | Tafazolli et al. | |
| 2005/0271057 A1 | 12/2005 | Kim et al. | |
| 2006/0003775 A1 * | 1/2006 | Bull et al. | 455/456.1 |

FOREIGN PATENT DOCUMENTS

| | | |
|---|---|---|
| EP | 1 137 305 A1 | 9/2001 |
| JP | 2006-201813 A1 | 7/1994 |
| JP | 2008-070305 A1 | 3/1996 |
| JP | 2002-152798 A1 | 5/2002 |

(Continued)

OTHER PUBLICATIONS

International Search Report dated Apr. 24, 2008 (3 pages).

(Continued)

*Primary Examiner* — Sam Bhattacharya
(74) *Attorney, Agent, or Firm* — Myers Bigel Sibley & Sajovec, P.A.

(57) ABSTRACT

The present invention relates to a positioning node and method for determining a position of a target UE in a cellular mobile telecommunication network. The network comprises means for identifying the RBS that the target UE is connected to, whereby the location of the identified RBS is known, and means for selecting a first and a second additional UE, wherein at least one of the first and second additional UEs is connected to a RBS that is different from the RBS that the target UE is connected to. The positioning node comprises input means adapted to receive information associated with measurement of the round-trip-time between the target UE and the identified RBS, information associated with measurement of the round-trip-time between the first additional UE and the RBS it is connected to, information associated with measurement of the round-trip-time between the second additional UE and the RBS it is connected to, information associated with measurements between the target UE and a first additional UE, information associated with measurements between the target UE and a second additional UE, information associated with measurements between the first additional UE and the second additional UE, and a calculator adapted to determine the position of the target UE by using the knowledge of the identified RBS and the received information.

14 Claims, 8 Drawing Sheets

(56) References Cited

FOREIGN PATENT DOCUMENTS

| | | |
|---|---|---|
| JP | 2002-281468 A1 | 9/2002 |
| JP | 2004-015147 A1 | 1/2004 |
| JP | 2005-507070 A1 | 3/2005 |
| JP | 2005-510172 A1 | 4/2005 |
| JP | 2005-148025 A1 | 6/2005 |
| JP | 2005-326303 A1 | 11/2005 |
| JP | 2006-090868 A1 | 4/2006 |
| JP | 2006-090882 A1 | 4/2006 |
| JP | 2006-105662 A1 | 4/2006 |
| JP | 2006-287897 A1 | 10/2006 |
| WO | WO 02/50563 A1 | 6/2002 |
| WO | WO 03/098953 A1 | 11/2003 |
| WO | WO 2004/012375 A2 | 2/2004 |
| WO | WO 2005/034557 A1 | 4/2005 |

OTHER PUBLICATIONS

Communication with Supplementary European Search Report, EPO Application No. EP 07 74 8590, Jan. 16, 2013.

Qualcomm Europe, "Support for additional UE measurements in PCAP for Enhanced Cell-ID location methods", 3GPP TSG RAN WG3 meeting #56, Agenda Item: 12.6.7, Tdoc R3-070956, Kobe Japan, May 7-11, 2007, 4 pp.

* cited by examiner

METHOD AND ARRANGEMENT FOR POSITIONING IN A MOBILE TELECOMMUNICATION NETWORK

TECHNICAL FIELD

The present invention relates to a method and arrangement for positioning in a mobile telecommunication network. In particular, the present invention relates to an improved method and arrangement for positioning a target User Equipment (UE) by using the cell identity of the radio base station that the target UE is connected to.

BACKGROUND

All cellular mobile telecommunication networks are divided into cells, served by one specific base station. Each base station may serve more than one cell. The important point from a positioning and navigation perspective is that the cell where a specific User Equipment (UE) (also referred to as terminal) is located is known in the cellular system. Hence, after determination of the geographical area covered by a specific cell, it can be stated that the UE is located somewhere within said geographical area, as long as it is connected and the reported cell identity of the serving cell is equal to the cell identity of the particular geographical area.

The accuracy of the cell identity positioning method is limited by the size of the cell, something that prevents it from being used in more sophisticated navigation applications. Its main advantages include a very low response time as well as the fact that it is widely spread and always available where there is cellular coverage. The cell identity method is also straightforward to implement and has no UE impact. The advantages has lead to an interest for a development of the cell identity positioning methods. These methods are referred to as enhanced cell identity positioning methods and they aim at enhancing the accuracy of the basic cell identity method at the same time as the advantages of the method are retained.

One principle for the enhanced cell identity positioning aims at combining a cell extension model preferably by using polygons (which will be explained below) with a distance measure. The cell extension model implies that a model of the coverage of a RBS is determined. Two possibilities regarding the distance measure are round trip time (RTT) measurements and/or path loss measurements. The more accurate of these two alternatives is the round trip time measurement. The path loss measurement suffers from shadow fading effects, which results in accuracies which are of the order of half the distance to the UE. The round trip time measurement principle is depicted in FIG. 1. Briefly, the travel time of radio waves from the Radio Base Station (RBS) to the UE and back is measured. The distance (r) from RBS to UE then follows from the formula:

$$r = c \frac{RTT}{2}$$

where RTT is the round trip time and where c is the speed of light.

The round trip time measurement alone defines a circle, or if the inaccuracy is accounted for, a circular strip around the RBS. By combining this information with the cell polygon, left and right angles of the circular strip can be computed. FIG. 1 illustrates the cell identity positioning method combined with round trip time. The terminal position is determined as the intersection of the serving cell and the circular strip.

In several systems, among these the Wideband Code Division Multiple Access (WCDMA) system, Round Trip Time (RTT) can be used to identify the distance from the antenna at which a UE is positioned. This provides a distance but it is not possible to ascertain where in the circle or sector the UE is. If RTT measurements determine that the UE is for example 500 m from the base station this is along an arc in a sector or the circumference of a circle. Triangulation measurements of RTT from several base stations can be used to increase accuracy. Triangulation measurements of RTT is a method where up to three RBSs measure the distance to the same UE, or cell ID. A UE in soft handover is also in an area relatively equidistant to two base stations where the UE can be identified as present. However this method is restricted by low availability which is caused by the likelihood that three RBS are in the active set is typically 10-15%.

As stated above, a preferred representation of the geographical extension of the cell is given by the cell polygon format, as further described in 3GPP, TS 23.032, "Universal Geographical Area Description (GAD). The extension of a cell is described by 3-15 corners of a closed polygon which does not intersect itself, cf. FIG. 1. The format is two-dimensional and the corners are determined as pairs of longitudes and latitudes in the WGS84 geographical reference system.

An example of a cell polygon with corners A-E is shown in FIG. 2. The RBS is normally located close to one of the corners of the cell polygon that describes the cell coverage.

It should be noted that due to the complexity of the radio propagation, the cell polygon format is only an approximation of the extension of the true cell. The selection of the polygon format is dictated by the need to have a reasonably flexible geographical representation format, taking e.g. computation complexities and reporting bandwidths into account.

Since the polygon format approximates the cell extension (i.e. the cell coverage), the polygon is normally pre-determined in the cell-planning tool to represent the cell extension with a certain confidence. The confidence is intended to represent the probability that the UE is located within the polygon, conditioned on the fact that it is connected to the cell (RBS) that is represented by said cell polygon. The underlying off-line calculation of the cell polygon can e.g. be based on coverage simulations of varying levels of sophistication. However, the end result is normally not very reliable when the confidence of the calculated cell extension is considered. The consequence is a need to tune the confidence and the pre-calculated cell polygon for each cell, using field data. This can normally not be afforded though.

Another idea for enhanced cell identity positioning has been to use pre-calculated maps of the regions where the UE is in soft(er) handover with one or several cells. Soft(er) handover is further described in H. Holma and A. Toskala, WCDMA for UMTS—Radio access for third generation mobile communications. Chichester, UK: Wiley, 2002. This typically occurs in areas where the distances to the serving RBSs are about the same. Such areas are significantly smaller than the whole cell and whenever the UE is in such an area, there is a possibility to determine its location with a better accuracy than with the basic cell identity positioning method. Normally these maps are pre-calculated in the planning tool, exactly as the cell polygons.

SUMMARY

An object with present invention is to improve the existing cell identity positioning.

According to a first aspect, this is achieved by a method for determining a position of a target User Equipment, UE, in a cellular mobile telecommunication network. The cellular mobile telecommunication comprises a plurality of radio base stations, RBS, adapted to communicate wirelessly with UEs, at least one radio network controller adapted to control at least one of said RBSs. The method comprises the steps of: identifying the RBS that the target UE is connected to, whereby the location of the identified RBS is known, selecting a first and a second additional UE, wherein at least one of the first and second additional UEs is connected to a RBS that is different from the RBS that the target UE is connected to, receiving information associated with measurement of the round-trip-time between the target UE and the identified RBS, obtaining information associated with measurement of the round-trip-time between the first additional UE and the RBS it is connected to, obtaining information associated with measurement of the round-trip-time between the second additional UE and the RBS it is connected to, receiving information associated with measurements between the target UE and a first additional UE, receiving information associated with measurements between the target UE and a second additional UE, receiving information associated with measurements between the first additional UE and the second additional UE, and determining the position of the target UE by using the knowledge of the identified RBS and the received information.

According to a second aspect, this is achieved by a positioning node for determining a position of a target User Equipment, UE, in a cellular mobile telecommunication network. The cellular mobile telecommunication comprises a plurality of radio base stations, RBS, adapted to communicate wirelessly with UEs, at least one radio network controller adapted to control at least one of said RBSs, wherein the network comprises means for identifying the RBS that the target UE is connected to (e.g. a radio network controller), whereby the location of the identified RBS is known, and means for selecting a first and a second additional UE, wherein at least one of the first and second additional UEs is connected to a RBS that is different from the RBS that the target UE is connected to. The means for selecting the first and additional UE may be a determining unit in the target UE or an entity in a network node. The positioning node comprises input means adapted to receive information associated with measurement of the round-trip-time between the target UE and the identified RBS, information associated with measurement of the round-trip-time between the first additional UE and the RBS it is connected to, information associated with measurement of the round-trip-time between the second additional UE and the RBS it is connected to. The round-trip-time measurements can either be obtained from a memory within the positioning node or from the UEs or RBSs. Further, information associated with measurements between the target UE and a first additional UE, information associated with measurements between the target UE and a second additional UE, information associated with measurements between the first additional UE and the second additional UE are also received by means of the first I/O means and the positioning node comprises a calculator adapted to determine the position of the target UE by using the knowledge of the identified RBS and the received information.

An advantage with the present invention is that positioning with high accuracy is achieved by the combination of round-trip-time measurements between the target UE and the RBS and further measurements between the target UE and at least two additional UEs.

An advantage with embodiments of the invention is that a high availability is provided since the need for UEs in SHO (Soft handover) for triangulation calculations is avoided.

A further advantage with embodiments of the present invention is that it can be used as a backup for Emergency Services. If there is no GPS data available for whatever reason, RBS to UE measurements and UE to UE round-trip-time measurements or single-trip-time measurements can be used to locate emergency calls or to follow a target UE. Moreover, if the accuracy is within FCC (Federal Communications Commission) requirements (emergency calls are required to be located to within 50 m 67% of the time, and within 150 m 95% of the time) the method according to embodiments of the invention may also be an alternative to GPS.

DETAILED DESCRIPTION

Figure 1:
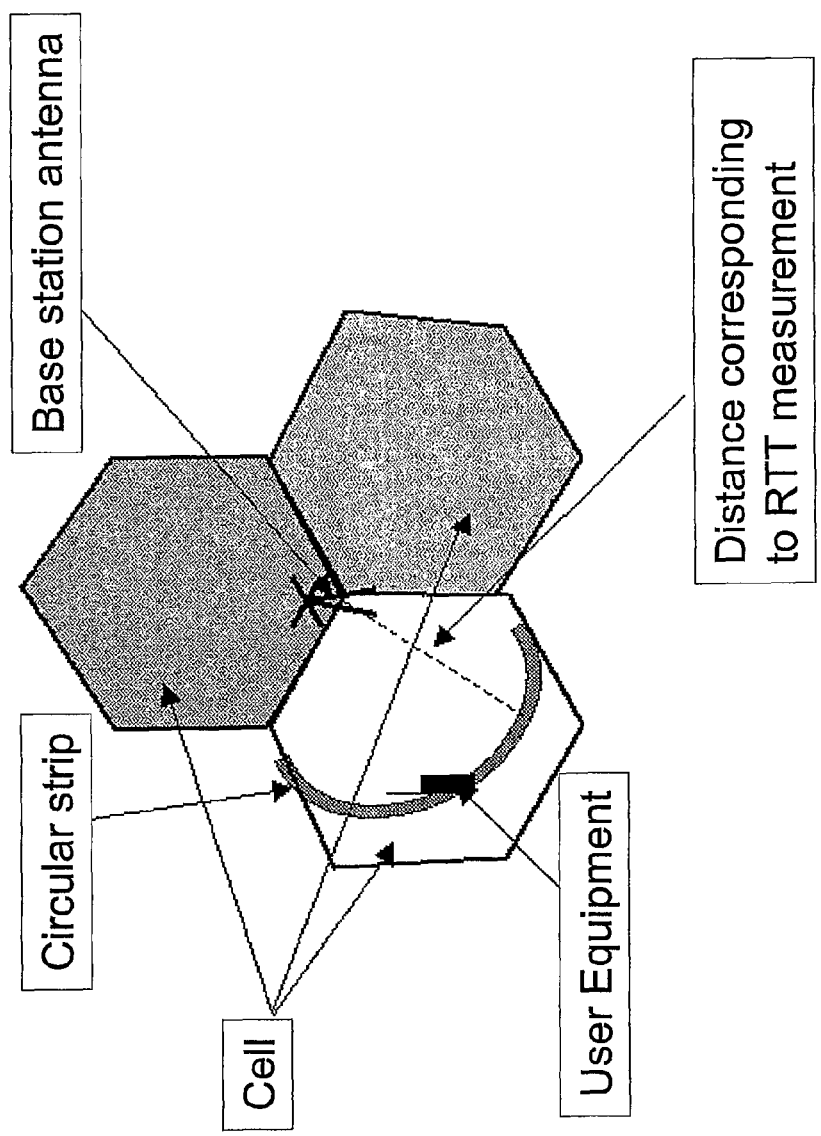
FIG. 1 shows the cell identity positioning method combined with round-trip-time delay.
Figure 2:
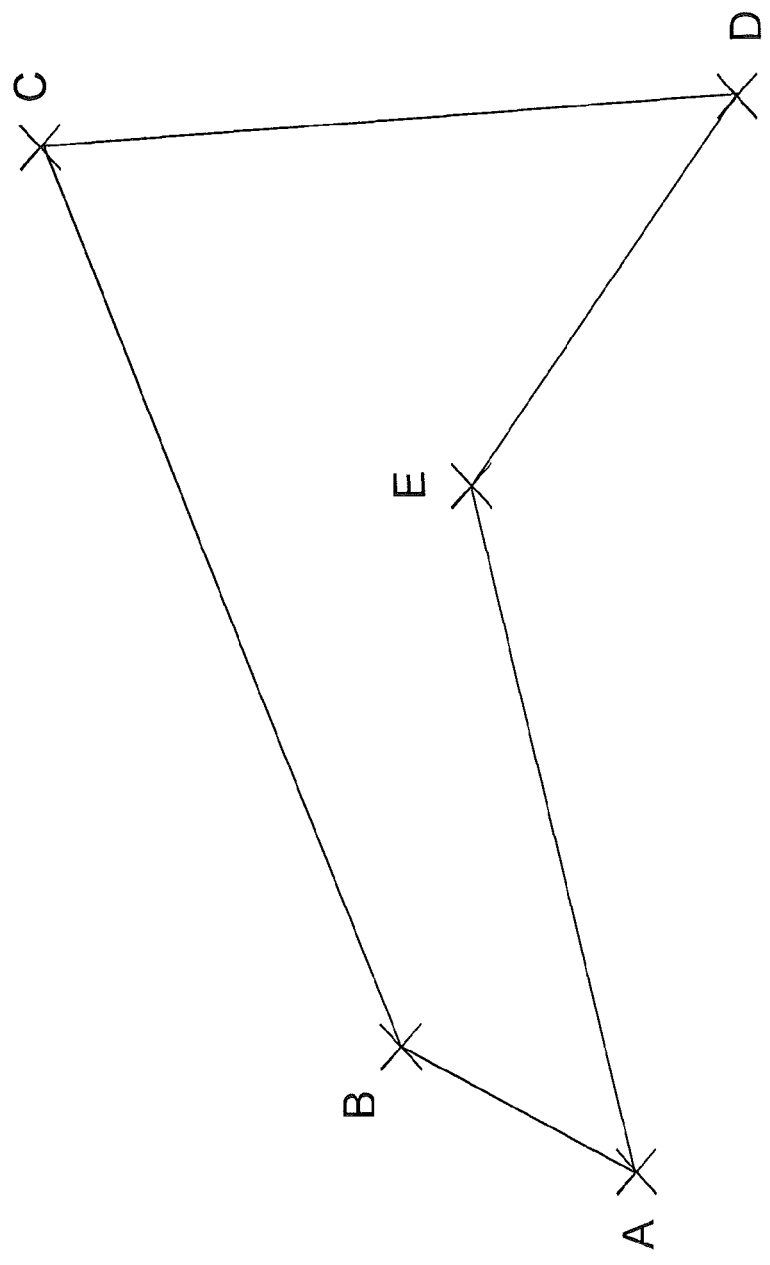
FIG. 2 shows an example of a cell polygon with the corners A-E.

The present invention introduces a method and an arrangement for increasing the relative accuracy of Round-trip-time (RTT) measurements between a target UE and the RBS that the UE is connected to, referred to as RBS-UE RTT measurements, wherein the target UE is the UE that is to be positioned. That is achieved by selecting at least a first additional UE and a second additional UE. The RBS-UE RTT measurements are according to the present invention combined with measurements between the target UE and the first additional UE and measurements between the target UE and the second additional UE and measurements between the first additional and the second additional UEs. Further, RTT measurements between the first additional UE and its RBS and between the second additional UE and its RBS are also required. These RTT measurements may already be available for the positioning node. The measurements between the UEs are referred to as UE-UE measurements. By using these measurements the physical distance between the three UEs used in the measurements can be established, and thereby a location point for the target UE can be reached.

UE-UE measurements imply in this specification that the UEs are able to communicate directly with each other. Thus the combination of the RBS-UE RTT measurements with the UE-UE measurements provides an enhanced measurement of the distance of the target UE from the RBS and from the additional UEs in a measurement group to more accurately establish where, in the cell, or the sector, the target UE is located.

Hence, the present invention is applicable to Radio Access Technologies (RAT) where direct UE-UE communication is possible. Therefore, the present invention is applicable to Long-term evolution (LTE), 4G and ad hoc networks. However, if other RATs develop direct UE-UE capabilities then the present invention would also be applicable for these other RATs.

Further, fixed relay points, with an identity and with the capability to send and receive radio waves in the same way as a UE can be used to enhance the accuracy or reduce complexity of calculations, for example intruder alarms, fire alarms, or cameras with movement detectors.

In order to achieve an unambiguous solution the first and the second additional UEs have to be selected such that the first additional UE is connected to a first RBS and the second additional UE is connected to a second RBS whereby the target UE is not connected to either the first or the second RBS.

Alternatively, one of the first or the second additional UE may be connected to the same RBS as the target UE. However, then in order to achieve an unambiguous solution, it is required to have knowledge about the location of at least said first or second additional UE.

In accordance with embodiments of the present invention, round-trip-time measurements between the UEs are used where the UEs in the RAT are not synchronized, and single trip time measurements are used where the UEs in the RAT are synchronized.

Signalling between UEs and the RBSs over the radio interface results in a connection message to identify the first and the second additional UE in adjacent cells whereby the said identified UEs send a signal directly to each other and the RTT or STT is used to calculate physical distance in a circle around the UE to one or several UEs in the calculation group.

Figure 3:
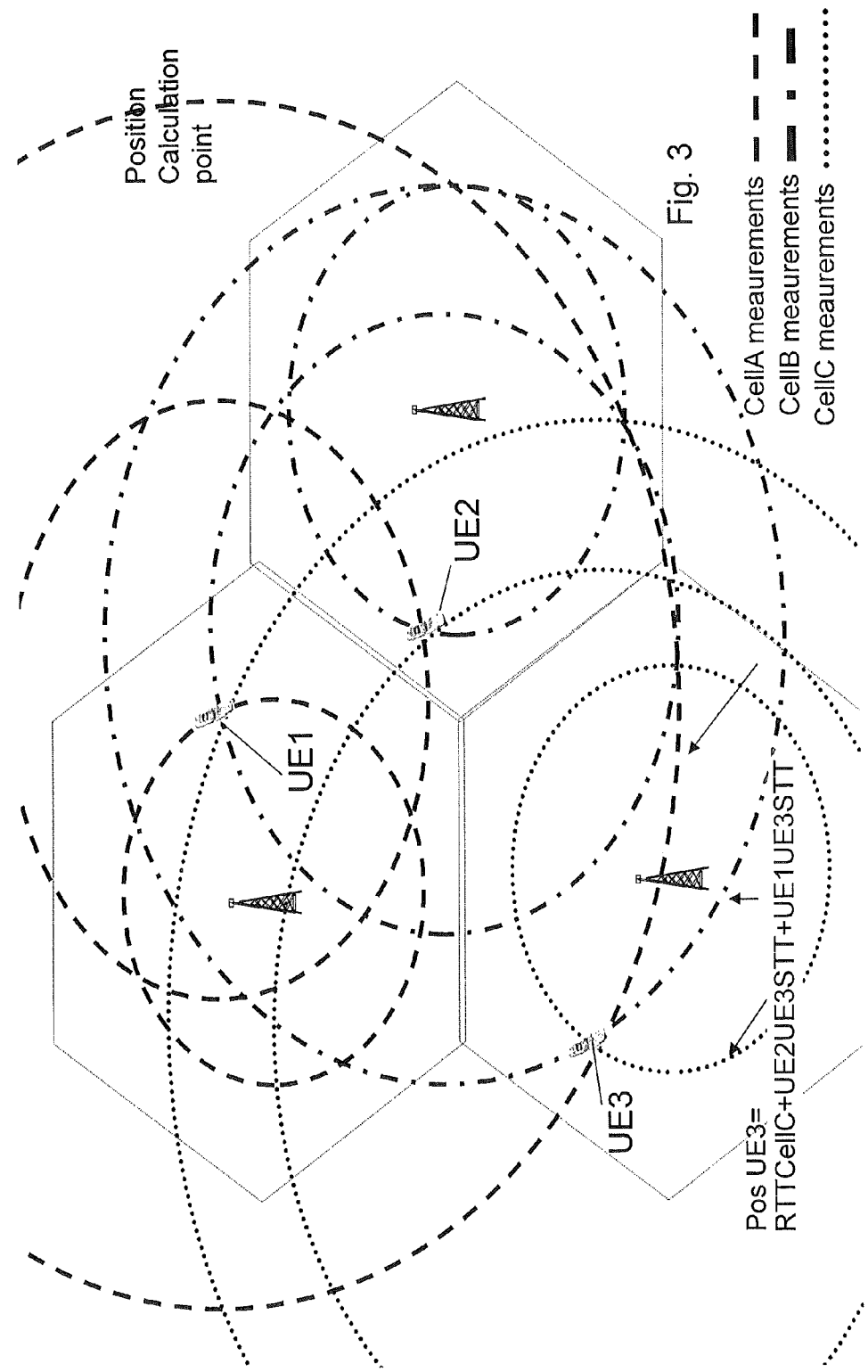
FIG. 3 shows the positioning of a UE3 at a dissection point RTT cell C+UE2UE3STT+UE1UE3STT (i.e. (round-trip-time between UE3 and cell C)+(single trip-time between UE2 and UE3)+(single-trip-time between UE1 and UE3)).

The physical distances that are calculated are from the RBS that the target UE is connected to each UE in the form of RTT, and between UEs in the form of UE to UE RTT or STT measurements. The triangulation of these measurements result in a situation where the target UE's RTT measurement perimeter is dissected by RTT/STT measurements from the other UEs. The positioning node calculates the UE positioning result and sends the positioning message to the UE, the service application or another instance that requests the data. The position of the target UE is thus identified. FIG. 3 is an illustration showing the identification of UE3 at dissection point RTTCellC+UE2UE3STT+UE1UE3STT i.e. (round-trip-time between UE3 and cell C)+(single trip-time between UE2 and UE3)+(single-trip-time between UE1 and UE3)). The position of the UEs is calculated by solving a nonlinear set of equations. In order to get a unique position it is necessary that the number of measurements is larger or equal to the number of unknowns.

The unknown parameters are here the two-dimensional coordinates for each UE. If N is the number of UEs, then this is equal to 2N.

The number of measurements is N UE-RBS RTT measurements plus $N*(N-1)/2$ UE-UE RTT measurements, assuming all UE pairs can measure RTT to each other. This gives $N*(N+1)/2$ measurements.

For N=3 we get 6 unknowns and 6 measurements, hence a solution is possible to obtain.

Assume RBSi has location coordinates $(x_{bi}, y_{bi})$, i=1, 2, 3 and UEi has coordinates $(x_i, y_i)$, i=1, 2, 3. Mathematically the problem can then, with perfect measurements, be stated as follows $$r_{b1} = ((x_{b1}-x_1)^2 + (y_{b1}-y_1)^2)^{1/2}$$

$$r_{b2} = ((x_{b2}-x_2)^2 + (y_{b2}-y_2)^2)^{1/2}$$

$$r_{b3} = ((x_{b3}-x_3)^2 + (y_{b3}-y_3)^2)^{1/2}$$

$$r_{12} = ((x_1-x_2)^2 + (y_1-y_2)^2)^{1/2}$$

$$r_{13} = ((x_1-x_3)^2 + (y_1-y_3)^2)^{1/2}$$

$$r_{23} = ((x_2-x_3)^2 + (y_2-y_3)^2)^{1/2}$$

With 6 equations and 6 unknowns, a unique solution may exist. However, when all three RBS locations coincide, there is no unique solution. This can be shown e.g. by deriving the Jacobian of the equations above. The Jacobian matrix contains as element (i,k) the derivative of measurement #i with respect to parameter #k, where i=1, ..., 6 and k=1, ..., 6. Here parameters can be arbitrarily ordered as $(x_1, y_1, x_2, y_2, x_3, y_3)$. For the case where $x_{b1}=x_{b2}=x_{b3}$ and $y_{b1}=y_{b2}=y_{b3}$, then the Jacobian matrix becomes singular which signifies that no unique solution exists. A continuum of possible locations, satisfy the equations. When two BS location are equal, it is conjectured that at least two possible, distinct solutions exist. For other cases, the parameter vector can be solved for using techniques known in the art, like Taylor series search, or even an exhaustive search along the circular arcs. As an alternative, one may assume that the distances $r_{b1}, r_{b2}, r_{b3}$ are well-known and parameterize the problem with only the angles to the UEs. In this case, the systems of equations is only of dimension 3 which makes it more tractable to solve.

Additional UEs can be added in the calculation cluster to increase accuracy, for example where it is known that additional UEs have another RBS-UE RTT measurement, or where a UE-enabled device with a fixed position is used as a constant in the calculation.

Algorithms and equations needed for these calculations can be dynamic in as far as the value of certain variables do not have to be measured, as their value becomes apparent from other measurements. In this way measuring resources can be limited, or their calculation method can be done according to needs. The radio base station antenna is a valid calculation constant as it does not move and can therefore figure in positioning calculations, or UE-enabled fixed position devices, e.g. UE equipped units that are stationary where the position of the unit is set at installation and set at static.

The position calculation is done in the positioning node. The positioning node may be implemented in a cell-serving network controlling node for the radio access technologies or a node where such a calculation can take place. In a synchronized network the UE to UE measurement is preferably a single trip time measurement, that is, a message back to the signal originating UE is not required. In an unsynchronized network, RTT is used including signalling of the difference between UE reception and transmission time instants.

In networks where RTT UE-UE positioning is possible, i.e. where direct UE to UE communication is enabled, messages will pass between entities in the calculation cluster. These calculations differ depending on whether or not the UEs in the network are synchronized. This dependency provides three cases, described in more detail below:

Case 1—RTT measurements from unsynchronized UEs are collected in the target UE and positioning information is sent to the positioning node of the Radio Access Network (RAN).

Case 2—STT measurements from synchronized UEs are sent directly to the positioning node of the RAN.

Case 3—STT measurements from synchronized UEs are collected in the target UE and positioning information is sent to the positioning node of the RAN.

All cases start with an initial positioning request from the Core Network (CN) for a positioning calculation directed towards the target UE that has been identified as being in a particular cell, where other UEs are also known to be present.

It should be noted that RTT measurements between the UEs and the RBS are presupposed to be already active and valid in the cell where the UEs (including the target UE) are present.

Figure 4:
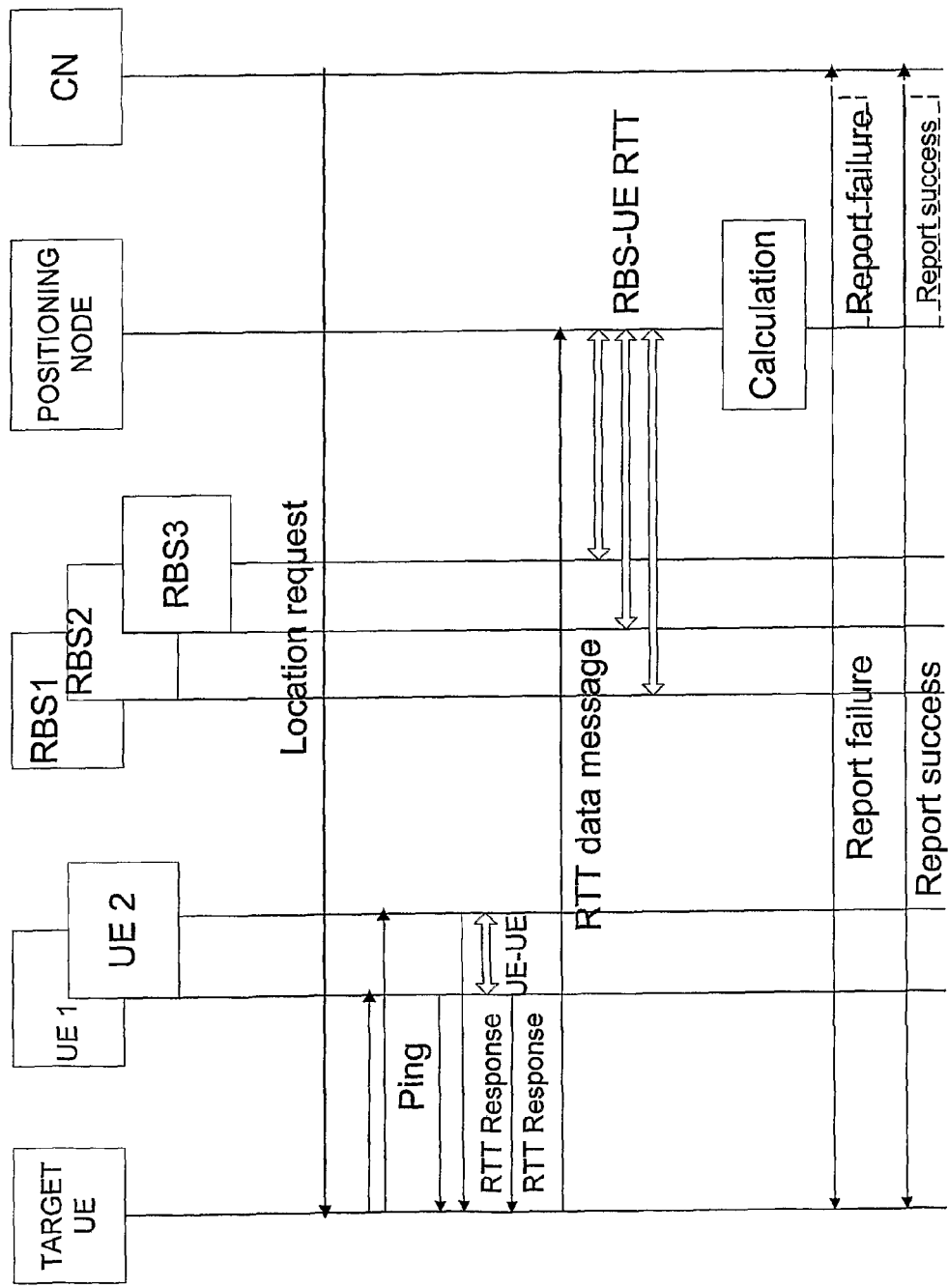
FIG. 4 is a signaling flowchart of case 1 in accordance with one embodiment of the present invention.

Case 1 will now be described in more detail in conjunction with the flowchart of FIG. 4 in accordance with one embodiment of the present invention.

When the target UE has received the positioning request from the CN, the target UE sends a ping message with UE-id and cell-id to other UEs in a measurement cluster. The message may either be directed to specified UEs that the target UE knows may be able to receive the ping message (e.g. from previous monitoring of said specified UEs transmissions), or sent without a recipient ID, so that all UEs receiving the ping message may send a reply. This procedure may be controlled by the network operator and by any controlling entity in the network. The measuring UEs send a return message with UE-id, cell-id and RX-TX time difference measurement back to the target UE. The target UE, or the network may be adapted to select a first additional UE and a second additional UE from the measurement cluster. This selection should be incidental, and should not be intrusive or breech integrity. Preferably it should be a part of the signalling in the radio interface. The selected UEs may be informed by the target UE, by a network node, or by the positioning node, before the UE-UE measurements are performed (not shown in the figures).

The data of the return message is collected for the selected first and second additional UEs in the target UE. The return messages are used to determine the RTT between the target UE and the first additional UE and the second additional UE, respectively. The target UE sends a request to the first and second additional UE and requests RTT measurements to be performed between the first additional UE and the second additional UE, and the result of those RTT measurements is transmitted to the target UE.

Further, the collected data of the target UE is sent in a message to the positioning node in RAN where the positioning node verifies that valid RTT measurements between the target UE and its RBS, between the first additional UE and its RBS and between the second additional UE and its RBS are available, e.g. stored in a memory of the positioning node. If valid RTT measurements are not available, then the missing RTT measurements has to be performed. The RAN can initiate a request for the missing RTT measurements. The positioning node can now perform triangulation calculation of the combined UE to UE measurements and the UE to RBS measurements. The positioning message comprising a position of the target UE is returned to the target UE or to the origin of the positioning request.

All measurements will be calculated with compensatory values for all system variables in the message chain to make the measurement as accurate as possible to ensure the quality of the positioning message.

Figure 5:
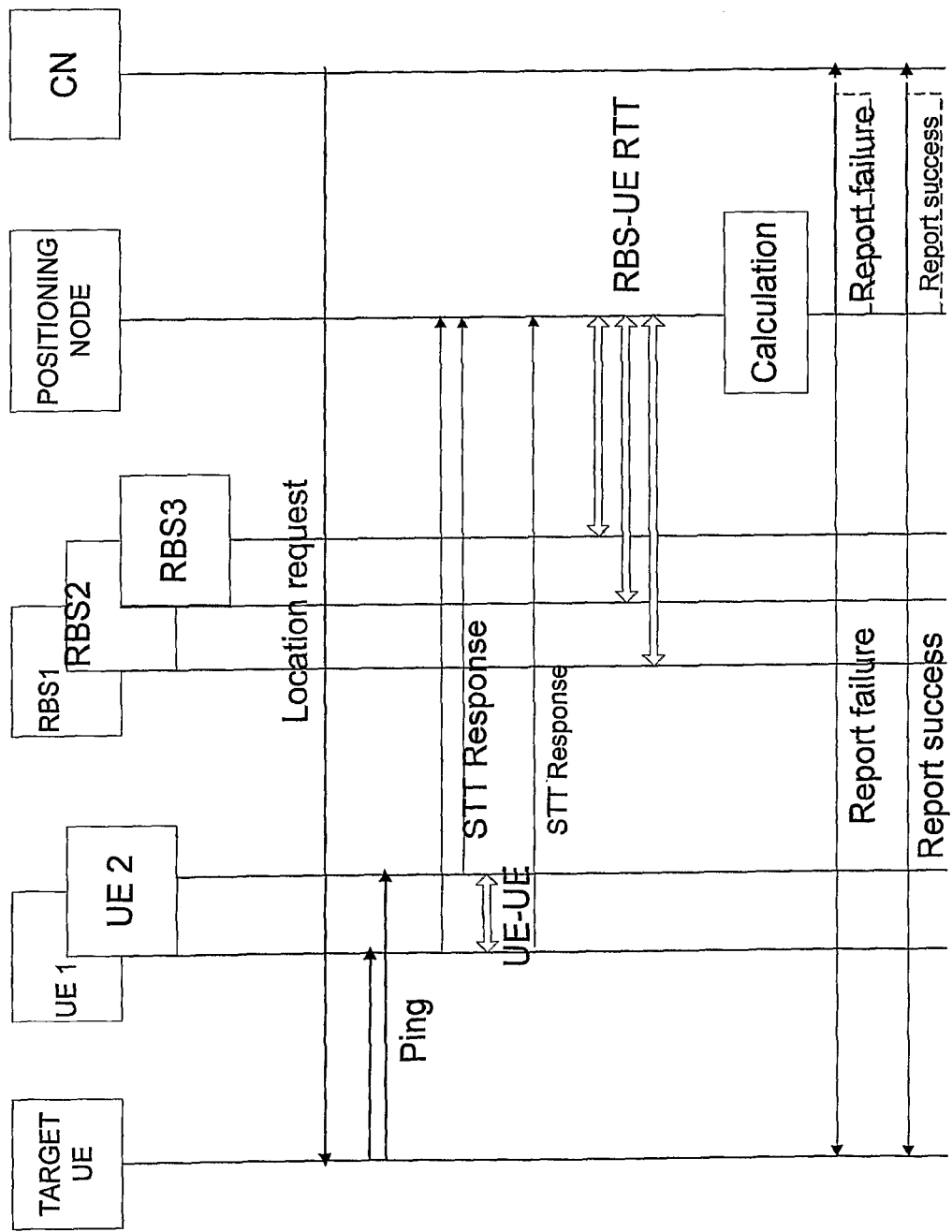
FIG. 5 is a signaling flowchart of case 2 in accordance with one embodiment of the present invention.

Case 2 will now be described in more detail in conjunction with the flowchart of FIG. 5 in accordance with one embodiment of the present invention.

When the target UE has received the positioning request from the CN, the target UE sends a ping message with UE-id and cell-id to UEs in the measurement cluster. The measuring UE sends a message with UE-id, cell-id and Single Trip Time (STT) measurement to the positioning node. The positioning node selects a first additional UE and a second additional UE from the UEs of the measurement cluster, and the measured STT and UE-id and cell-Id for said first and second additional UEs are stored in the positioning node. The first and the second additional UEs are informed that they are selected as the first and second additional UEs, e.g. by the target UE (not shown). The selection is performed in the same way as described above. It should be noted that the measuring UEs may calculate the distance based on the STT measurements, or the distance calculation is performed in the positioning node. The positioning node then sends a request to the first additional UE and second additional UE for an STT measurement to be performed between the first additional UE and the second additional UE and transmitted to, and collected by the positioning node.

The positioning node determines if there are available valid UE-RBS measurements for the first additional UE, the second additional UE and the target UE as described above. If there is any missing valid RTT measurements the positioning node requests that such measurements should be performed. Then the triangulation calculation of the combined UE to UE STT and UE to RBS RTT is computed. The positioning message is returned to the target UE or to the origin of the positioning request.

Figure 6:
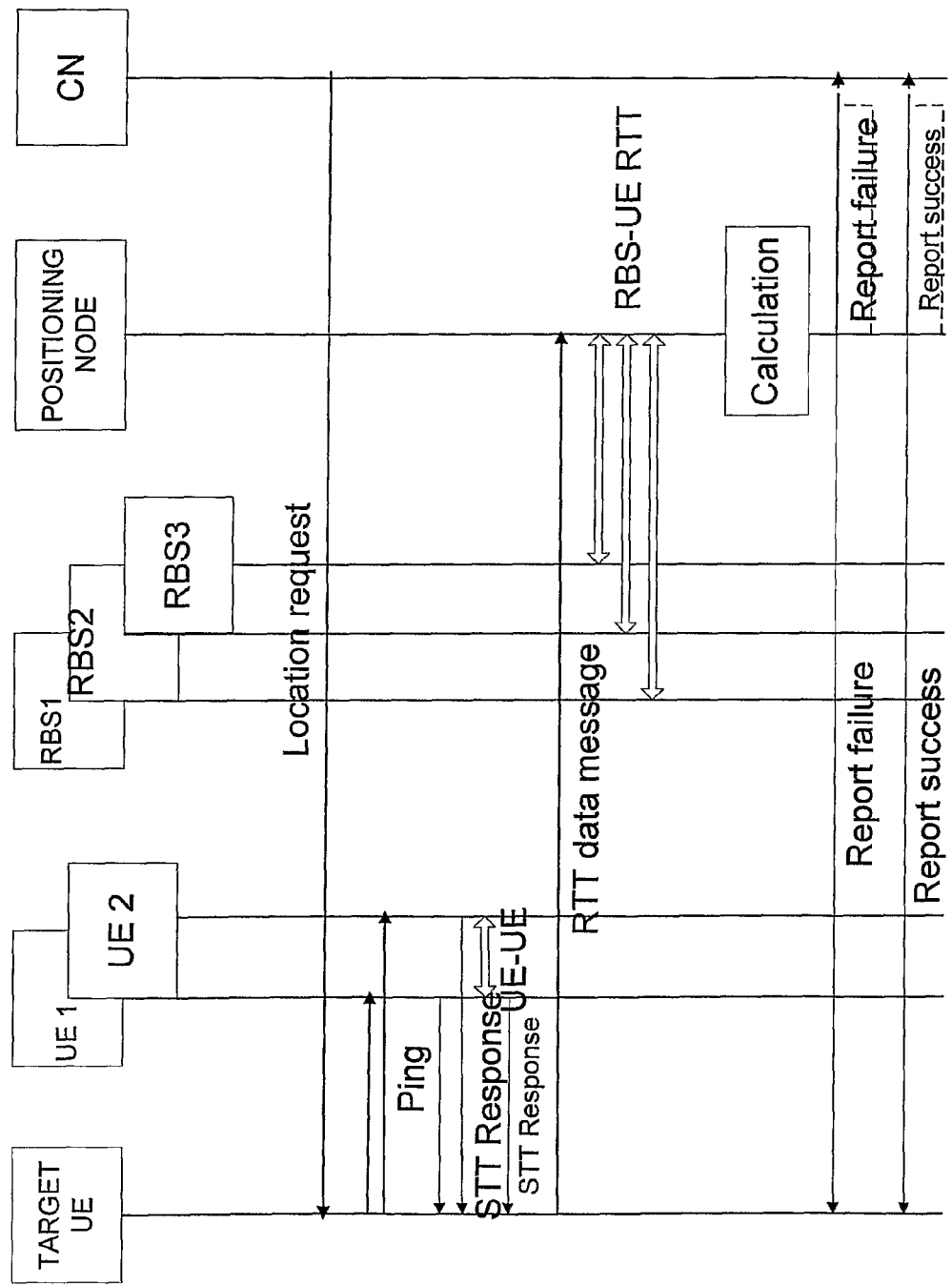
FIG. 6 is a signaling flowchart of case 3 in accordance with one embodiment of the present invention.

Case 3 will now be described in more detail in conjunction with the flowchart of FIG. 6 in accordance with one embodiment of the present invention.

When the target UE has received the positioning request from the CN, the target UE sends a ping message with UE-id and cell-id to UEs in the measurement cluster. The measuring UE sends a message with UE-id, cell-id and Single Trip Time (STT) measurement to the target UE. The measuring UEs may calculate the distance, or the target UE calculates the distance, or a combination thereof is performed whereby distance calculations from both the measuring UEs and the target Ue are used and a distance is determined by using an average value. The target UE selects a first additional UE and a second additional UE from the measurement cluster as described above, and the measured STT and UE-id and cell-Id for said first and second additional UEs are stored in the target UE. The first and the second additional UEs are informed that they are selected as the first and second additional UEs, e.g. by the target UE (not shown) or by a network node. An STT measurement is also performed between the first additional UE and the second additional UE and transmitted to, and collected by the target UE. The target UE sends the collected measurements to the positioning node.

The positioning node determines if there are available valid UE-RBS measurements for the first additional UE, the second additional UE and the target UE as described above. If there is any missing valid RTT measurements the positioning node requests that such measurements should be performed. Then the triangulation calculation of the combined UE to UE STT and UE to RBS RTT is computed. The positioning message is returned to the target UE or to the origin of the positioning request.

With reference to all three cases, case 1-3, if the calculation of the location of the target UE would fail, a measurement report failure message may be transmitted to the target UE and/or to the CN. On the other hand, if the calculation of the location of the target UE is successful, a success location report message may be transmitted to the target UE and/or to the CN. As stated above, the first and the second additional UEs should preferably be selected such that the first additional UE is connected to a first RBS and the second additional UE is connected to a second RBS, wherein the first RBS is different from the second RBS and the first and the second RBS are different from the RBS that the target UE is connected to. "Different" means in this specification that RBS1 is different from RBS2 if RBS1 antenna(s) are not at the same geographical location as RBS2 antenna(s)".

However one of the first and the second RBS may be the same as the target UE is connected to if at least one of the location of the first or the second additional UEs is known.

Figure 7:
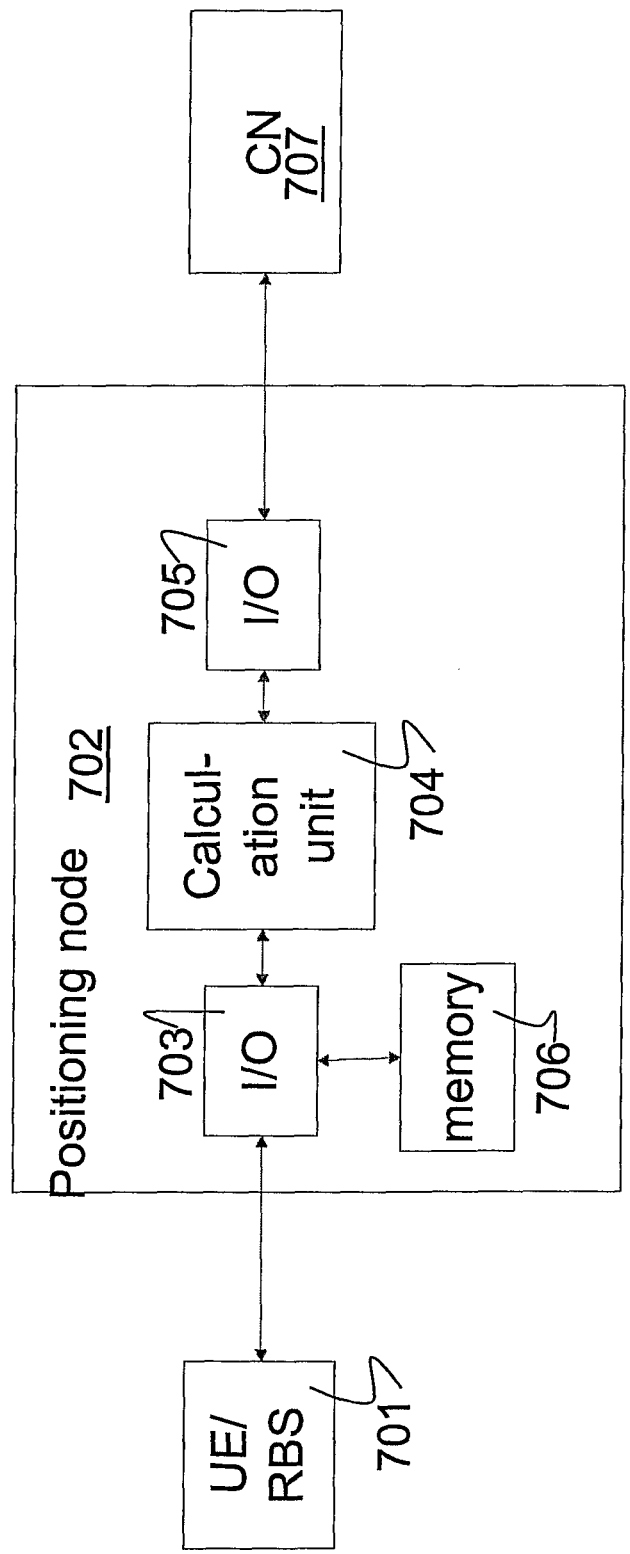
FIG. 7 shows schematically the positioning node according to an embodiment of the present invention.

Thus, the positioning node as illustrated in FIG. 7 in accordance with embodiments of the present invention comprises a first input/output (I/O) means 703 for receiving and transmitting messages from/to the UEs 701 and fetching and storing RTT measurements in a memory 706 (the illustrated UE/RBS in FIG. 7 should be understood to represent any UE/RBS) and the RBSs, a second I/O means 705 for receiving and transmitting messages from/to the CN 707).

Measurements received from the UEs 701 by means of the first I/O means 703 are transferred to a calculation unit 704 where the position of the target UE is calculated based on the received measurements and valid RTT measurements stored in the memory 706. The RTT measurements are the round-trip-time between the target UE and the identified RBS, the round-trip-time between the first additional UE and the RBS it is connected to, the round-trip-time between the second additional UE and the RBS it is connected to. If valid RTT measurements are not stored in the memory, RTT measurements must be performed by the relevant UE and its RBS. Measurements between the target UE and a first additional UE, measurements between the target UE and a second additional UE and measurements between the first additional UE and the second additional UE are also required.

The output of the calculating unit 704 is the location of the target unit and said output is transferred to the target Ue or another position requesting entity via the first 701 or the second I/O means 705. The first 701 and the second 705 I/O means may also be used for sending reports regarding a successful or failed location determination.

In the illustrated embodiments, the positioning node 702 is located in the radio access network. However, the positioning node may also be located in a UE (terminal). Then all disclosed messages intended for the positioning node that are sent to the radio access network, should instead be sent to the UE that comprises the relevant positioning node.

Figure 8:
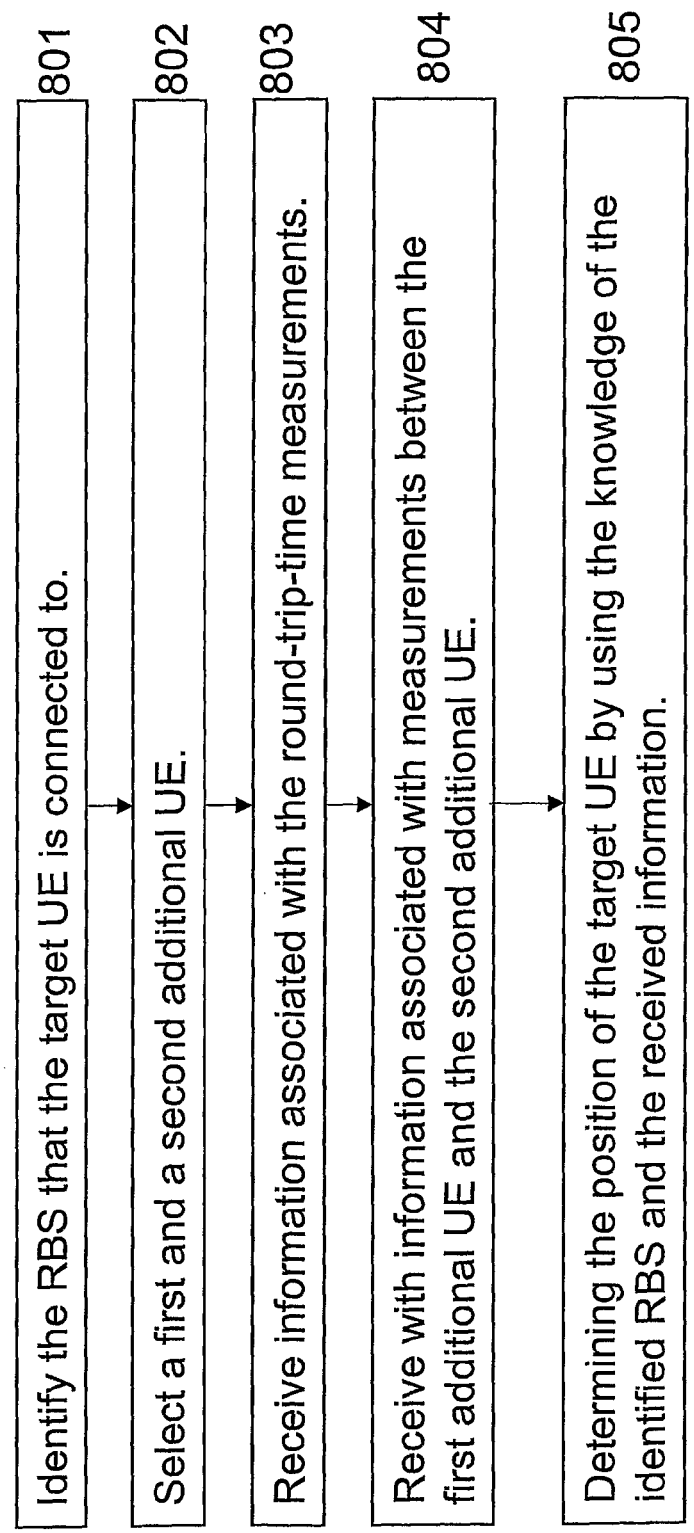
FIG. 8 shows schematically the method in accordance with the present invention.

The method according to the present invention is illustrated by the flowchart of FIG. 8 and comprises the steps of

801. Identify the RBS that the target UE is connected to, whereby the location of the identified RBS is known.

802. Select a first and a second additional UE, wherein at least one of the first and second additional UEs is connected to a RBS that is different from the RBS that the target UE is connected to.

803. Receive information associated with RTT measurements. This information is information associated with measurement of the round-trip-time between the target UE and the identified RBS, with measurement of the round-trip-time between the first additional UE and the RBS it is connected to, and information associated with measurement of the round-trip-time between the second additional UE and the RBS it is connected to. This information may be available for the positioning node, e.g. in a memory, or requested from the involved nodes.

804. Receive information associated with UE-UE measurements. This information is associated with measurements between the target UE and a first additional UE, with measurements between the target UE and a second additional UE, and with measurements between the first additional UE and the second additional UE.

805. Determining the position of the target UE by using the knowledge of the identified RBS and the received information.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for determining a position of a target User Equipment (UE) in a cellular mobile telecommunication network, where the cellular mobile telecommunication network comprises a plurality of radio base stations (RBS) to communicate wirelessly with UEs, at least one radio network controller to control at least one of said RBSs, the method comprising:
    identifying a RBS to which the target UE is connected, making a location of the identified RBS known,
    selecting a first additional UE and a second additional UE, where at least one of the first additional UE and the second additional UE is connected to a RBS that is different from the RBS to which the target UE is connected,
    receiving information associated with measurement of a round-trip-time between the target UE and the identified RBS,
    obtaining information associated with measurement of a round-trip-time between the first additional UE and the RBS to which the first additional UE is connected,
    obtaining information associated with measurement of a round-trip-time between the second additional UE and the RBS to which the second additional UE is connected,
    receiving information associated with measurements between the target UE and the first additional UE,
    receiving information associated with measurements between the target UE and the second additional UE,
    receiving information associated with measurements between the first additional UE and the second additional UE, and
    determining the position of the target UE by using the location of the identified RBS and the received information.

2. The method of claim 1, where the first UE is connected to a first RBS and the second additional UE is connected to a second RBS, where the first and second RBSs are different from the RBS to which the target UE is connected.

3. The method according to claim 1, where the method further comprises:
    receiving location information of a fixed point and where said location information is used when determining the position of the target UE.

4. The method according to claim 1, where at least one of the measurements between the target UE and the first additional UE, the measurements between the target UE and the second additional UE, or the measurements between the first additional UE and the second additional UE include a round-trip-time measurement.

5. The method according to claim 4, where the received information associated with the measurements between the target UE and the first additional UE, the received information associated with the measurements between the target UE and the second additional UE, and the received information associated with the measurements between the first additional UE and the second additional UE are received via the target UE.

6. The method according to claim 1, where at least one of the measurements between the target UE and the first additional UE, the measurements between the target UE and the second additional UE, or the measurements between the first additional UE and the second additional UE include a single-trip-time measurement.

7. The method according to claim 1, where the position of the target UE is determined in a positioning node in the cellular mobile telecommunication network.

8. The method according to claim 1, where the position of the target UE is determined in a UE.

9. A positioning node for determining a position of a target User Equipment (UE) in a cellular mobile telecommunication network, where the cellular mobile telecommunication network comprises a plurality of radio base stations (RBS) to communicate wirelessly with UEs, at least one radio network controller to control at least one of said RBSs, where the network comprises means for identifying a RBS to which the target UE is connected, making a location of the identified RBS known, and means for selecting a first and a second additional UE, where at least one of the first additional UE and the second additional UE is connected to a RBS that is different from the RBS to which the target UE is connected, the positioning node comprising:

input means for receiving information associated with measurement of a round-trip-time between the target UE and the identified RBS, information associated with measurement of a roundtrip-time between the first additional UE and a RBS to which the first additional UE is connected, information associated with measurement of a round-trip-time between the second additional UE and a RBS to which the second additional UE is connected, information associated with measurements between the target UE and the first additional UE, information associated with measurements between the target UE and the second additional UE, and information associated with measurements between the first additional UE and the second additional UE, and a calculator to determine the position of the target UE by using the the location of the identified RBS and the received information.

10. The positioning node of claim 9, where the first UE is connected to a first RBS and the second additional UE is connected to a second RBS, where the first and second RBSs are different from the RBS to which the target UE is connected.

11. The positioning node according to claim 9, where the input means is further for receiving location information of a fixed point and where said location information is used when determining the position of the target UE.

12. The positioning node according to claim 9, where at least one of the measurements between the target UE and the first additional UE, the measurements between the target UE and the second additional UE, or the measurements between the first additional UE and the second additional UE include a round-trip-time measurement.

13. The positioning node according to claim 12, where the received information associated with the measurements between the target UE and the first additional UE, the received information associated with the measurements between the target UE and the second additional UE, and the received information associated with the measurements between the first additional UE and the second additional UE are received via the target UE.

14. The positioning node according to claim 9, where at least one of the measurements between the target UE and the first additional UE, the measurements between the target UE and the second additional UE, or the measurements between the first additional UE and the second additional UE include a single-trip-time measurement.

* * * * *

UNITED STATES PATENT AND TRADEMARK OFFICE
CERTIFICATE OF CORRECTION

| | | |
|---|---|---|
| PATENT NO. | : 8,565,782 B2 | Page 1 of 1 |
| APPLICATION NO. | : 12/663995 | |
| DATED | : October 22, 2013 | |
| INVENTOR(S) | : McAleenan et al. | |

It is certified that error appears in the above-identified patent and that said Letters Patent is hereby corrected as shown below:

On the Title Page, item (75), under "Inventors", in Column 1, Line 1, delete "Alta" and insert -- Älta --, therefor.

In the Claims:

In Column 11, Line 31, in Claim 9, delete "roundtrip-time" and insert -- round-trip-time --, therefor.

In Column 12, Line 6, in Claim 9, delete "the the" and insert -- the --, therefor.

Signed and Sealed this
Twenty-seventh Day of May, 2014

Michelle K. Lee
*Deputy Director of the United States Patent and Trademark Office*